United States Patent [19]

Brown

[11] E Patent Number: Re. 33,648

[45] Reissued Date of Patent: Jul. 30, 1991

[54] VARIABLY ADJUSTABLE SHOE INSERTS

[75] Inventor: Dennis N. Brown, Custer, Wash.

[73] Assignee: Northwest Podiatric Laboratories, Inc., Blaine, Wash.

[21] Appl. No.: 39,002

[22] Filed: Apr. 15, 1987

Related U.S. Patent Documents

Reissue of:

[64] Patent No.: 4,510,700
Issued: Apr. 16, 1985
Appl. No.: 431,291
Filed: Sep. 30, 1982

[51] Int. Cl.[5] ..... A43B 13/38; A43B 13/40

[52] U.S. Cl. ..... 36/44; 36/28; 36/92; 128/595

[58] Field of Search ..... 36/28, 44, 43, 91, 92, 36/88; 128/584, 585, 595, 614, 615, 80 D, 583, 587, 622

[56] References Cited

U.S. PATENT DOCUMENTS

| | | | |
|---|---|---|---|
| 865,836 | 9/1907 | Wedekind | 128/595 |
| 1,980,621 | 11/1934 | Innis | 36/44 |
| 2,403,442 | 7/1946 | Klaus | 36/103 |
| 3,416,245 | 12/1968 | Ferreira | 36/44 |
| 3,585,737 | 6/1971 | Gilkerson | 36/43 |
| 4,232,457 | 11/1980 | Mosher | 36/44 |
| 4,338,734 | 7/1982 | Schwartz | 36/44 |
| 4,346,525 | 8/1982 | Larsen et al. | 128/595 |
| 4,413,430 | 11/1983 | Brown | 36/91 |
| 4,435,910 | 3/1984 | Marc | 36/44 |
| 4,510,700 | 4/1985 | Brown | 36/92 |
| 4,520,580 | 6/1985 | Brown | 36/44 |

FOREIGN PATENT DOCUMENTS

| | | | |
|---|---|---|---|
| 569571 | 8/1958 | Belgium | 128/595 |
| 461852 | 3/1926 | Fed. Rep. of Germany | 128/622 |
| 1509112 | 1/1968 | France | 36/44 |
| 508720 | 1/1955 | Italy | 36/43 |

*Primary Examiner*—Steven N. Meyers
*Attorney, Agent, or Firm*—Hughes & Multer

[57] ABSTRACT

An insert for a shoe, boot, or the like which is capable of plural adjustments so as to adapt the insert to the unique physical conformation of the wearer's foot, to hold the foot in a neutral axis position substantially at all times, to return a foot into the neutral axis mode automatically, and to provide a wide range of support, resiliency, and angulation based on the needs of the user. The device as set forth lends itself to modification for various sports where lateral motion is of primary importance, shock absorption and longitudinal extension of the foot is of paramount importance, or for geriatric patients whereby a single insert and the modifying devices associated therewith address the vast spectrum of orthotic needs.

12 Claims, 6 Drawing Sheets

FIG 1
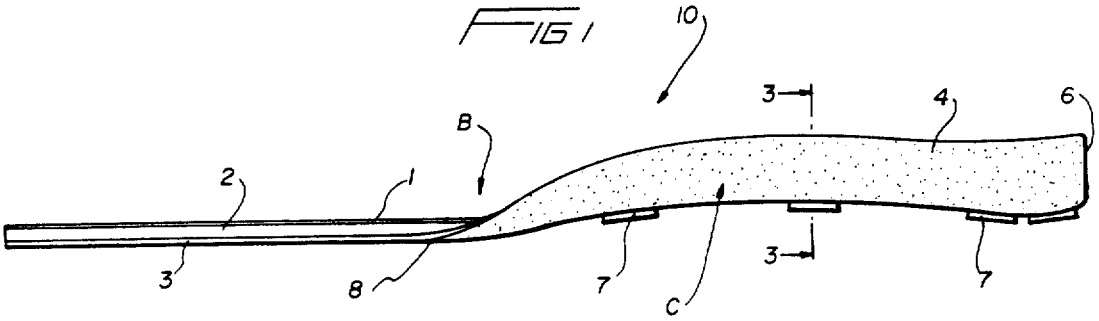
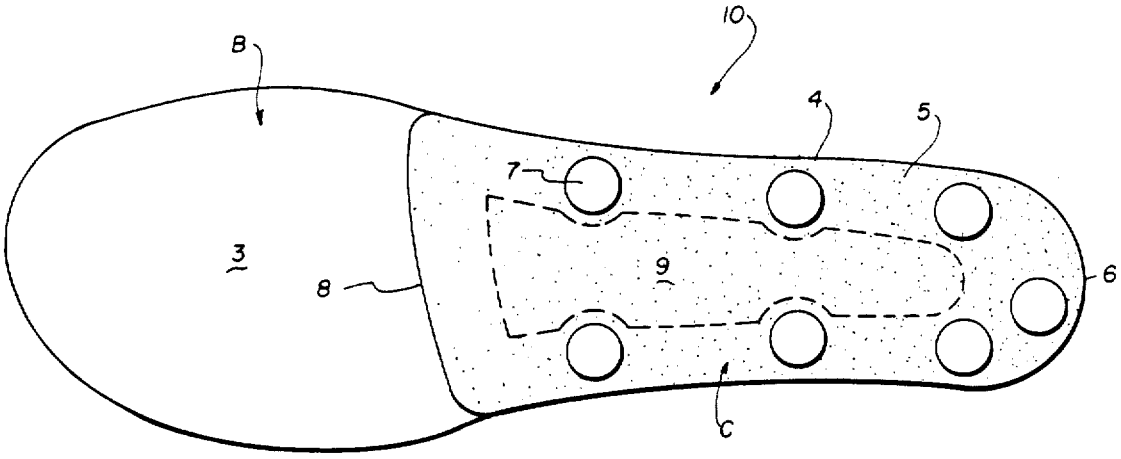
FIG 2
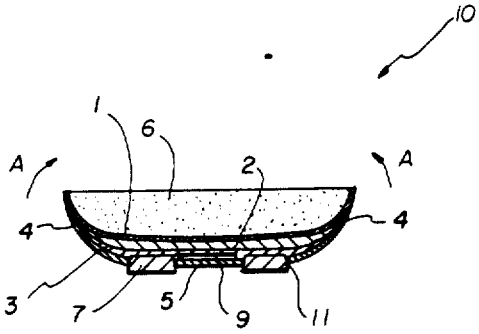
FIG 3

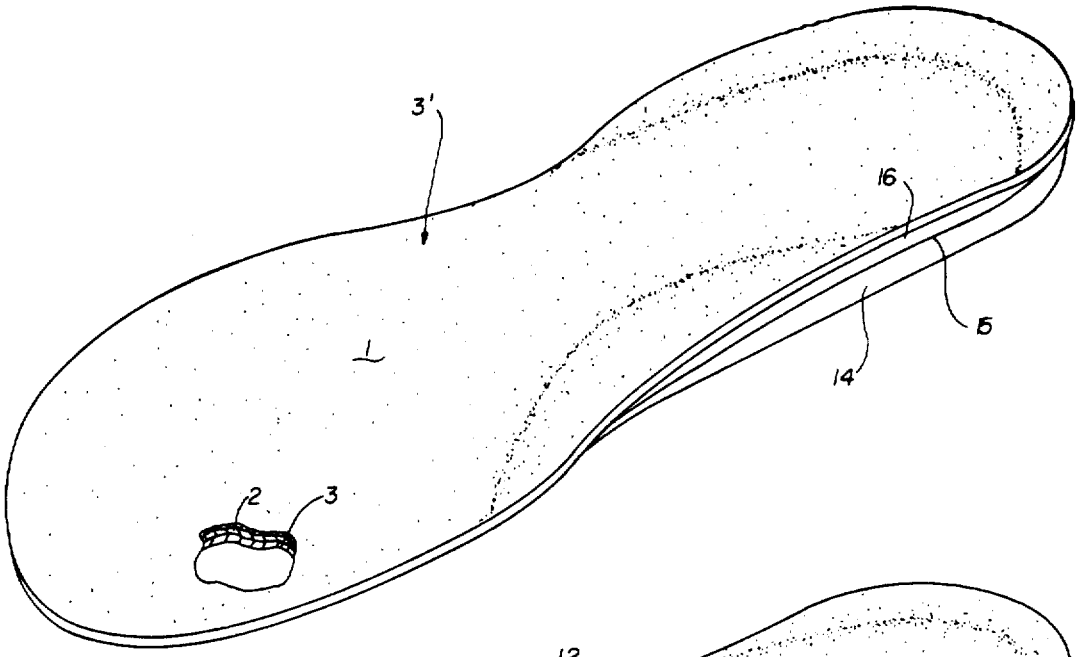
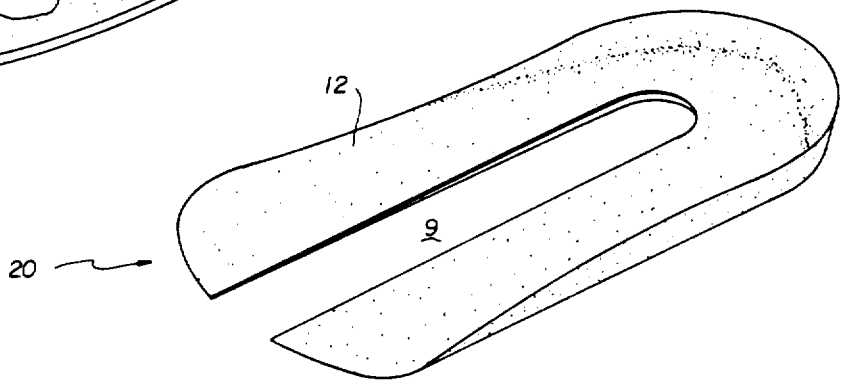
FIG 7
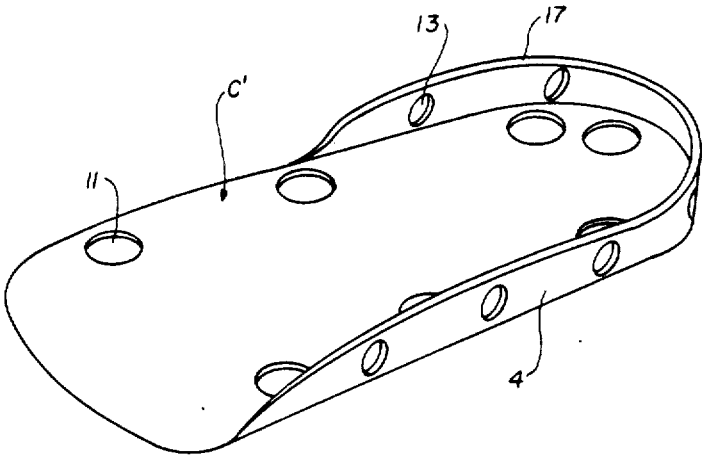

FIG 9
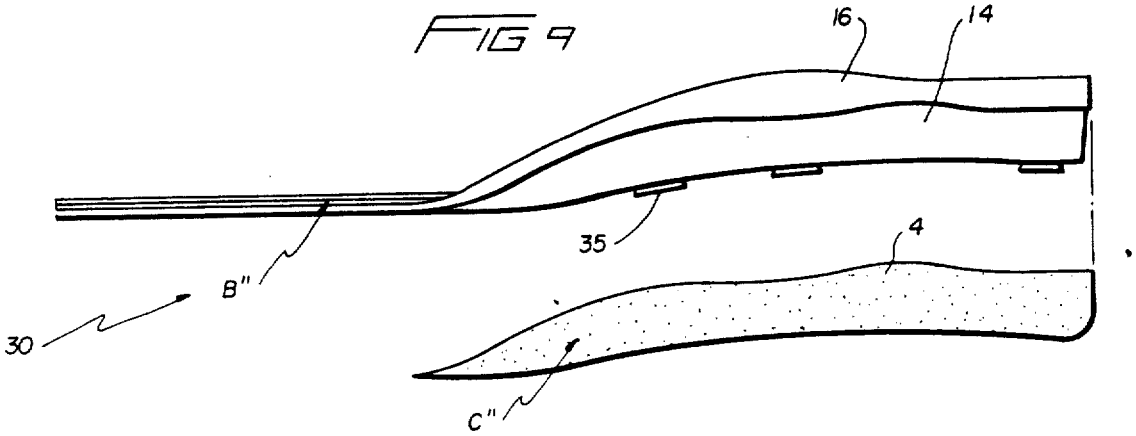
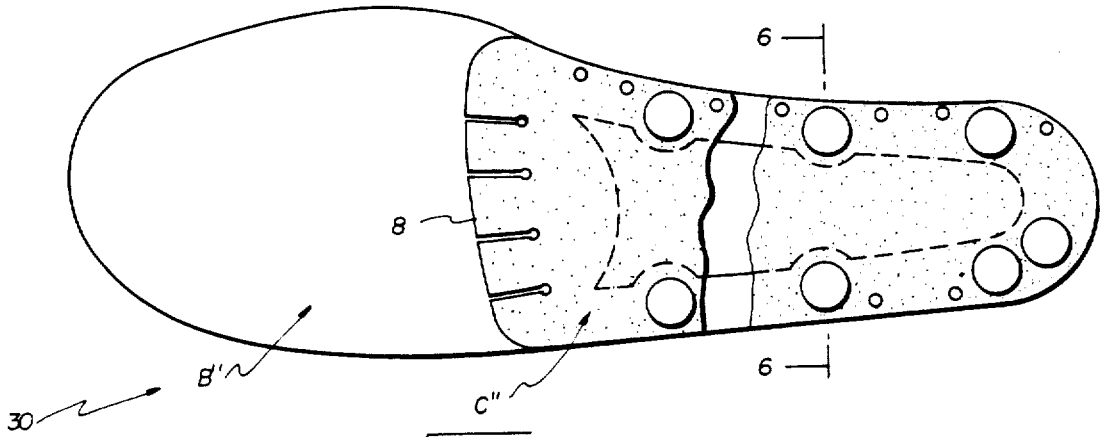
FIG 10
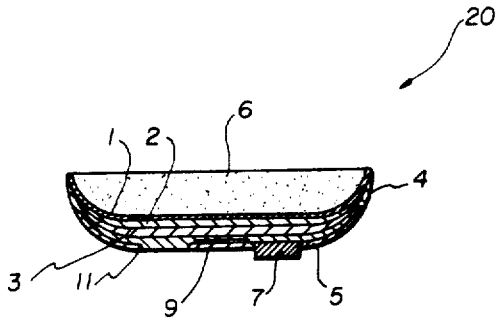
FIG 11

VARIABLY ADJUSTABLE SHOE INSERTS

Matter enclosed in heavy brackets [ ] appears in the original patent but forms no part of this reissue specification; matter printed in italics indicates the additions made by reissue.

BACKGROUND OF THE INVENTION

This invention relates generally to orthotic appliances and constitutes further developments since our pending application Ser. No. 324,820, filed Nov. 25, 1981 which is incorporated herewith by reference.

Fairly recently, greater attempts have been made to provide footwear which is anatomically correct so as to not only increase the comfort of the wearer, but also to minimize fatigue and injuries. This requires an analysis of the typical human gait. When one is moving substantially in a single linear direction, the gait consists of three distinct phases. First, the heel strike phase occurs during which the foot is essentially a "mobile adapter" ready to conform to the topographical contours encountered. Some of the impact forces are dissipated through the ankle and leg bones to the upper torso, while other impact forces are translated into the foot. The proper dissipation and translation of these forces during the heel strike phase produce a natural shock absorption mechanism. Second, the transition or mid gait phase transforms the mobile adapter into a rigid lever whereby the mid-tarsal joint becomes locked preparing the foot for translation of the accumulated and developing forces in a stable manner throughout the foot during the remainder of said cycle and the ensuing final phase called toe roll. This is the final propulsive said translatory phase of gait. After the toe leaves the ground the swing phase of the next step begins. The critical phase is the mid-gait or transition phase where the foot is transformed from a "mobile-adapter" to a "rigid lever". The optimum configuration for the ankle and tarsal joint at this point is to have the sub-talar joint in a neutral position as the mid-tarsal joint becomes locked and the foot becomes a "rigid lever". This allows the impact load to be properly dissipated and translated. While podiatrists have long been aware of the need to maintain the foot's proper orientation relative to the leg to provide a "rigid lever" and accordingly have prescribed orthoses for that purpose, the general populace rarely avails themselves of these services until after a certain amount of discomfort and/or damage has been done.

The following citations reflect the state of the art of which applicant is aware in so far as these patents appear to be germane to the patent process:

U.S. Pat. No. 2,669,814 Ritchey
U.S. Pat. No. 2,680,919 Riggs
U.S. Pat. No. 3,922,801 Zente
French No. 1,240,066 Strasbach
British No. 465,940 King.
Advertisment from Runner's World-July 1982-Saucony.

Of these, the patent to Ritchey appears to be of great interest since he teaches the use of an orthopedic device suitably positioned within a shoe or the like, in which the upper surface thereof has a complex contour addressed to the peculiarities of a given foot. The instant invention can be contrasted over this prior art by noting the contrasting ease with which the apparatus according to the instant application can be initially fitted to a person, or successively fitted as a function of time, while providing immediate relief.

Similarly, the patent to Riggs teaches the use of an insole type appliance having a compound contour like the Ritchey invention configured in such a manner as to provide foot relief based on Riggs' perception of a universal foot disorder.

Similarly, the Zente patent teaches the use of a liquid filled orthopedic apparatus composed of a plurality of discrete internal liquid filled ampules which are strategically placed between upper and lower laminae and sealed in place to provide separate support for various parts of the foot.

The publication from the July 1982 edition of Runner's World provides a substantially horseshoe shaped plastic insert preferably formed of hytril adapted to be placed in a rear foot area of the shoe between a mid-sole and an upper. This device is predicated on the assumption that heel strike is initiated on the outside area of the foot initially, and accordingly attempts to distribute the load more evenly around the heel area presumably due to the intrinsic shock absorbtion properties attendant with the use of hytril. As exemplified in other prior art devices discussed supra, the associated insert defined in this citation is based on a predisposed conception of a generic foot malady, and a single insert is provided in an attempt to rectify a perception of a universal foot disorder.

The instant application is distinguished over these citations in that a plurality of instrumentalities are provided which are adapted to be selectively utilized by the wearer so that mixing and matching of orthotics defined by the instant application encompasses a broader spectrum of foot disorders than would otherwise be available in accordance with the prior art. Moreover, the device according to the instant application is distinguished over the known prior art in that a contour on the top surface of the insert is adapted to coact with the plantar surface of a person's foot in an especially beneficial way so that elogation of the foot along the longitudinal axis is provided for by associated distortion of the orthotic appliance with concomitant deformation of the appliance that urges the foot to transmit forces in a uniform manner free of unwanted torsions and or torsional forces and accordingly applies flexibility and variations to selectively engage a wide spectrum of foot problems.

SUMMARY AND OBJECTS OF THE INVENTION

The instant invention is directed to and is characterized by an orthotic appliance adapted to be placed within a shoe, boot, or the like which is formed from initially two components. An upper blank having a top contour which generally following the configuration of the plantar surface of a person's foot. This contour is formed in such a way so that conformation of the wearer's foot tends to assume a neutral sub-talar joint and al locked mid-tarsal joint. The bottom portion of this blank has a longitudinally extending zone of lesser resilience along a center portion thereof from the calcaneal area of a person's foot up to a metatarsal area along with marginal portions on either side of this zone defining a plurality of downwardly extending protuberances adapted to coact with an underlying cap associated thereto by the protuberances. Together an interlocking instrumentality is provided the combination of which encourages a controlled appliance deformation. More specifically, the cap is adapted to be formed from one of a group of materials characterized in having an elastic resilient memory causing the device when unstressed to return to an initial state and when stressed is caused to distort in a dictated regulated manner to urge the foot to maintain an aspect defined as a neutral relationship beteen the sub-talar joint and the mid-tarsal joint. The cap also defines an area along a leading edge thereof adapted to be manipulated operatively in such a manner that the metatarsal area of a person can be operatively modified and conditioned so as to provide relief of pressure along the metatarsal area of the foot or any where else along the lateral aspect of the foot. By providing a uniform force distribution and force dissipation throughout the bone structure of the foot as it relates to the leg, the minimization of unwanted torsion and/or torsional forces allays an unwanted force component which can be felt and made manifest in the knee, hip and small of the back according to prior art techniques.

Accordingly, it is a primary object of this invention to provide an orthotic insert that is to be disposed within a shoe, boot, or the like whose contour and angulation is adapted to support the foot properly and encourage correction relative to the associated foot bones particularly the sub-talar joint and the mid-tarsal joint to encourage beneficial force dissipation and distribution to obtain bio-mechanical advantage in the anatomy of a person's foot and leg.

It is a further object of this invention to provide a device of the character described above which is relatively inexpensive to manufacture, extremely durable in construction, safe to use, and lends itself to mass production techniques.

It is yet a further object of this invention to provide a device of the character described above in which plural adjustments can be effected in order to address a wide spectrum of orthopedic problems.

It is still a further object of this invention to provide a device of the character described above which is so configured as to lend itself by adaptation to a plurality of specific needs (walking, running, basketball, racquet ball, etc.) specifically by the plural alterations that are indigenous.

A further object of this invention is to provide a device of the character described above which encourages a proper orientation of the foot and its associated bones relative to the leg in such a manner that the weight distribution is substantially uniform along the longitudinal axis of the foot based upon the individual foot components' weight bearing ability.

A further object of this invention is to provide a device which assists in orientating the sub-talar joint so as to be more aligned toward a neutral position and the mid-tarsal joint in a more functional position, that is locked.

These and other objects will be manifest when considering the following detailed specification when taken in conjunction with the appended drawing figures.

BRIEF DESCRIPTION OF THE DRAWING FIGURES

FIG. 1 is a side view of the apparatus according to one form of the present invention.

FIG. 2 is a bottom view thereof.

FIG. 3 is a sectional view taken along lines 3—3 of FIG. 1.

FIG. 7 is a perspective view of a further form of the invention in a preferred embodiment.

FIG. 9 is a side view partially exploded in a preferred embodiment according to the instant application.

FIG. 10 is a bottom plan view of that which is shown in FIG. 9.

FIG. 11 is a sectional view taken along lines 11—11 of FIG. 5.

BRIEF DESCRIPTION OF THE PREFERRED EMBODIMENT

Figure 4:
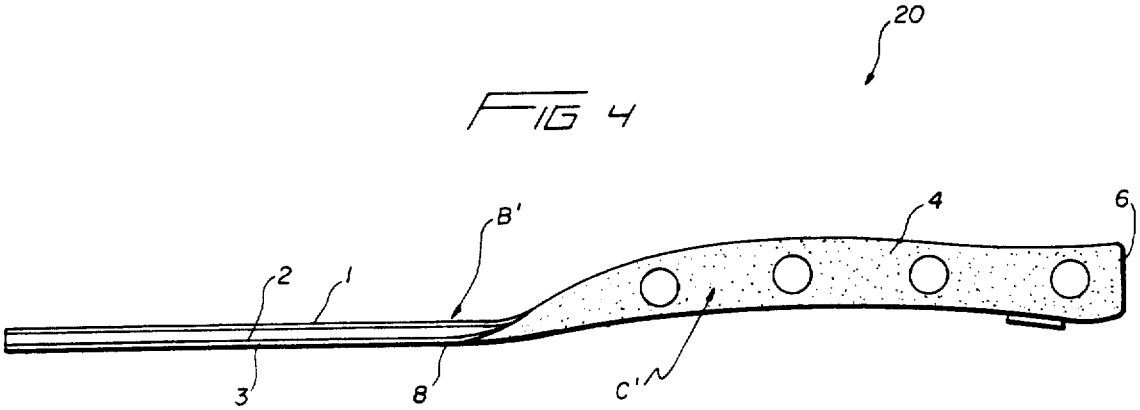
FIG. 4 is a side view of a second form of the invention.
Figure 5:
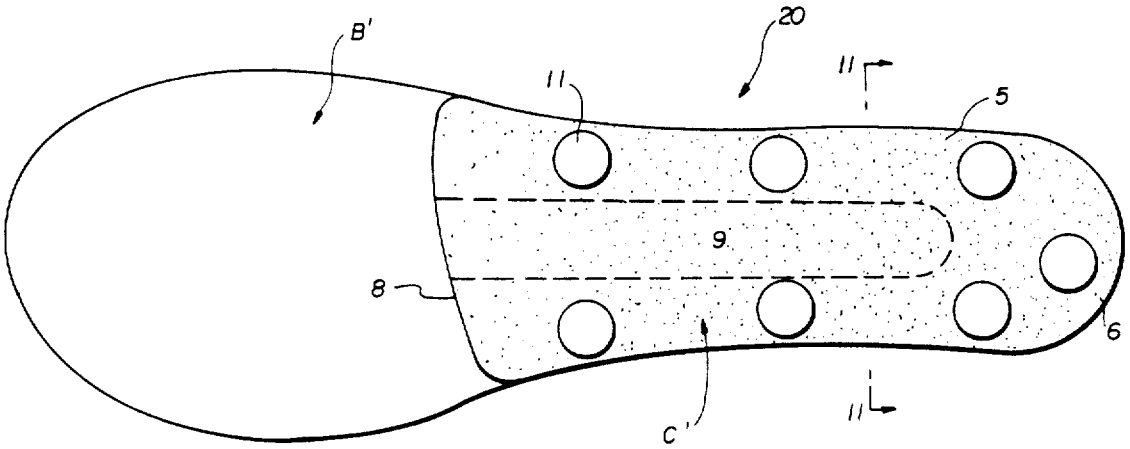
FIG. 5 is a bottom plan view of that which is shown in FIG. 4.
Figure 6:
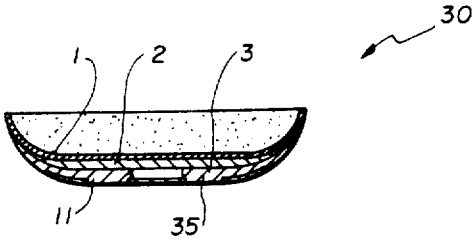
FIG. 6 is a sectional view taken along lines 6—6 of FIG. 10.

Referring to the drawings now, wherein like reference numerals refer to like parts throughout the various drawing figures, reference numeral 10 is directed to an orthotic insert according to one form of the present invention.

As shown especially well in FIGS. 1-3, the insert 10 is defined by a two component system that includes a full length blank B and a cap C which extends from the metatarsal area 8 rearwardly to a heel area 6.

The full length blank B has a top surface 1 formed from an abrasion resistant padded material such as synthetic fabric, nylon, dacron, felt, cloth or the like and a resilient underlying substrate 2 formed from rubber or its equivalent which padded material and rubber substrate are interconnected by means of adhesion or fusion. The lowermost portion of the full length blank defines a bottom layer 3 formed from a foamed material such as Freelen TM, Plastizote TM, or any other opened or closed celled foam characterized as being relatively resilient, having sufficient memory to return to its original state when unstressed, and capable of moderate shock absorption properties and loads.

The cap C is formed from a material which is comparatively rigid when contrasted with the upper full length blank B, and may formed from polyethylene, polypropylene (with or without diluents such as talc), epoxy and fiberglass, or graphite fibers combined with a resin, or polyurethane fibers bound in a resin, all of the above preferred constituents of the cap being characterized in having a predetermined and programmable resistance to deformation and torsion in such a manner that when distorted, fibers associated therewith (or the plastic as poured) reacts to deformation in a desired manner to be defined hereinafter.

The cap C is provided with a plurality of apertures running along medial and lateral marginal portions adapted to receive therewithin plugs 7 formed from any of the family of rubbers such a sorbothane, characterized in having a density and a resilience somewhat greater than that which defines the full length blank. The holes 11 in the cap allow the frictional insertion of the plugs 7 therewithin and are frictionally engaged in associated recesses formed in the full length blank B as is shown in FIG. 3. The longitudinal extent of the full length blank B includes a recess 9 running substantially from the calcaneal or heel area of the foot forward up to the metatarsal area of the foot so that elongation of the foot in the gait cycle provides deformation of the cap and blank to provide a zone within which the blank can be accommodated so as to provide controlled deformation of the full length blank. Concurrently, the cap is allowed to curve along the longitudinal extent so that medial and lateral edge portions 4 roll inwardly providing a controlled support for the heel which generates a preferred constraint and control on the foot, the blank and cap having a sufficient degree of programmed deformation to urge the sub-talar and mid-tarsal joint to become relatively oriented in a neutral axis position. The deformation of the insert is shown by the arrows A in FIG. 3.

FIGS. 4, 5, 7 and 11 show a second form of the invention wherein like reference numerals refer to like parts. The second embodiment 20 includes an elongate blank B′ which has in underlying relationship a ¾ length cap C′ as before. In this example, a further appliance 12 is provided of ¾ length or substantially the same dimension longitudinally as the cap, and is adapted to be disposed between the cap and the elongate blank. The medial layer 12 is formed from a cork resin mixture characterized as in its ability to expand substantially 2 to 3 times its original volume when heated and is of substantially U-shaped configuration defining the elongate longitudinal recess 9 as shown. The top surface of the cork resin layer 12 has a contour complemental to the bottom surface of the full length blank so that there is natural registry therebetween. A characteristic of the cork resin composition is that upon heating it will deform under pressure (as by one's foot in a wearing situation) to fill an associated void, and therefore the cap formed of the material set forth for the first embodiment will define the finished bottom configuration of the cork resin layer 12 as will now be defined.

A plurality of apertures 11 are provided on the medial and lateral segments of the cap, and a peripheral upwardly extending lip 4 is similarly provided with apertures 13 so that upon deformation of the cork resin layer 12, the apertures 11 and 13 are filled as suggested in FIG. 11. An intrinsic property of the cork resin and the bottom strata 3 of the full length blank B′ is that natural adhesion is known to exist between the two layers when the cork resin is suitably heated so that a bond along their interface has been effected. As shown in FIG. 11, one or more resilient plugs 7 can be inserted into the apertures 11 as shown so as to control and determine the angulation of a person's foot during the fitting procedure. The plug 7 extends within the cork resin to varied degrees depending upon the pressures associated therewith, and the cork resin when suitably pressured will extend into the holes 11, 13 so that a custom orthotic appliance has been provided. As shown in FIG. 7, the full length blank is provided along the medial, lateral and heel aspect with a side wall 14 adapted to be dimensioned in accordance with the width and height of the corresponding walls 4 of the cap so that upon assembly, a flush peripheral wall is provided. To this end, the side edge 14 defines, with the shelf 15 and an upper rim 16 off set from the wall 14 a periphery so that the thickness of the cap 17 is substantially the same as the shelf dimension 15 for nesting engagement. Of course some migration of the cork resin will occur between the inner wall of the cap 4 and the marginal peripheral portion 14 so that a bonding has been effected there as well. FIG. 11 shows the tapering nature of the cork resin as it extends up around the heel area. An added benefit of this technique is that the additional resilience of the cork resin has been provided, but the layer is of such a thickness that deterioration of the cork resin is not a consideration due to its laminated support and strength derived from not only the cap but the full length blank. Multiple orthopedic adjustments are therefore possible by use of the heated, deformable cork resin layer.

Figure 12:
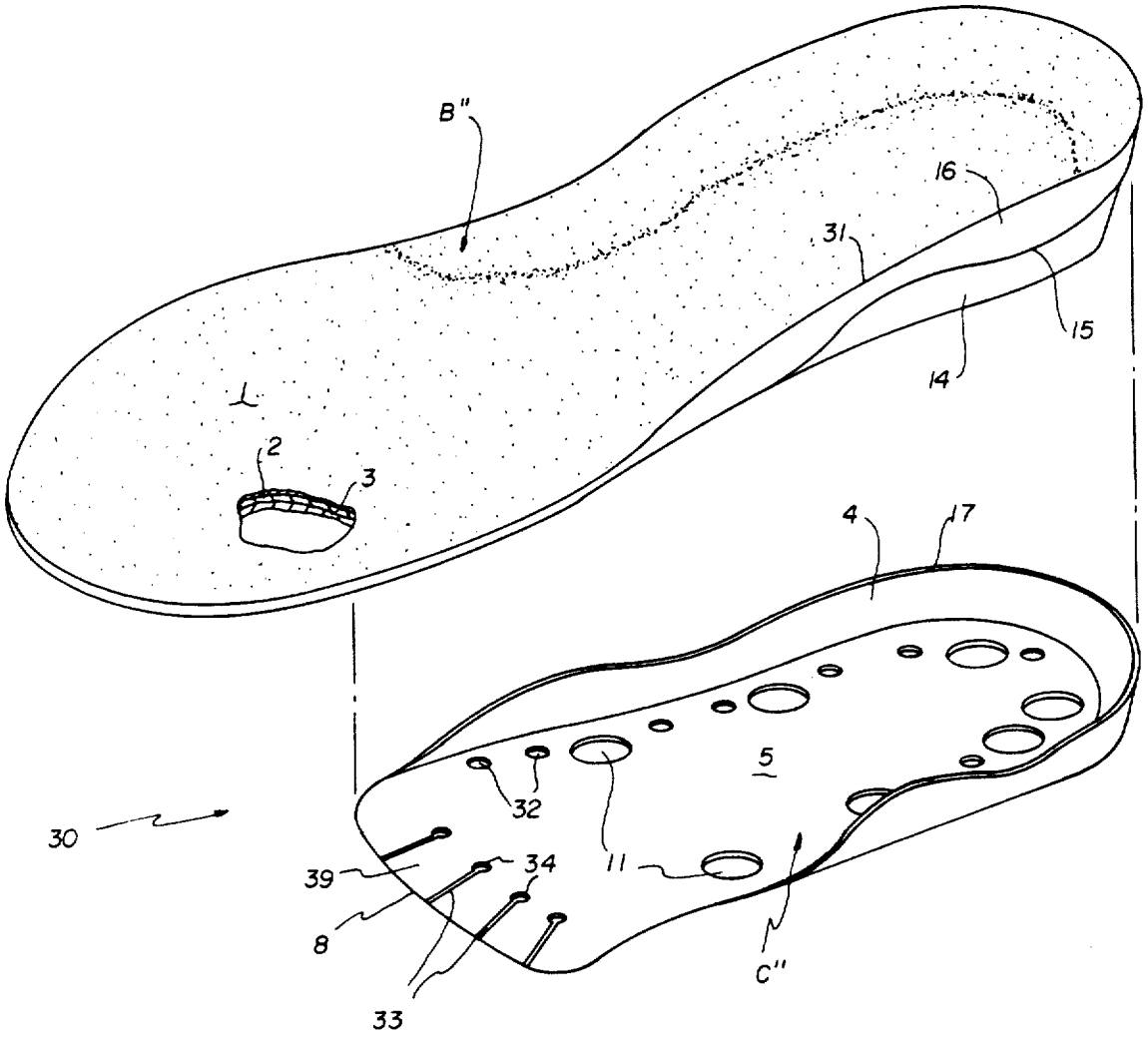
FIG. 12 is a ¾ persepctive view of the embodiment shown in FIGS. 8, 9 and 10 according to one form.

The remaining drawing figures reflect a current soon to be commercial embodiment demonstrative of further developments in this art. Accordingly, as shown in FIGS. 6, 8, 9, 10 and 12, an orthotic insert 30 is provided having a full length upper blank B″ formed of the materials 1, 2, 3 set forth hereinabove, which include a compound contour substantially conforming to the plantar surface of a person's foot and conformation to this contour tends to promote a neutral sub-talar joint and a locked mid-tarsal joint, and includes side walls 14 along a rear, lateral, and medial portions of a person's foot extending upwardly and including the shelf 15 and upper thickened area 16 adapted to complementally receive the cap C″ and the width 17 of the peripheral walls 4 as shown in FIG. 12 for example. The topmost edge 31 of the insert has been beveled and feathered to a fine edge 31 as shown.

The cap C″ includes a metatarsal head area 8 provided with a plurality of longitudinally extending slots 33, each slot terminating in a aperture 34. Thus, the leading edge of the cap and the associated slot define areas of separate resilience and flexibility which allow removal of any tab defined by the area between two adjacent grooves 33 so that a respective adjacent metatarsal area is at a higher elevation than the tab 39 which has been removed. Thus, pressure can be released from certain metatarsal areas to the benefit of people experiencing metatarsal discomfort, commonly geriatic patients. In addition, the slots 33 terminating in aperture 34 can also define areas for insertion therein of resilient fingers, particularly within the apertures 34 to provide an associated topographical disparity for additional pressure release.

Figure 8:
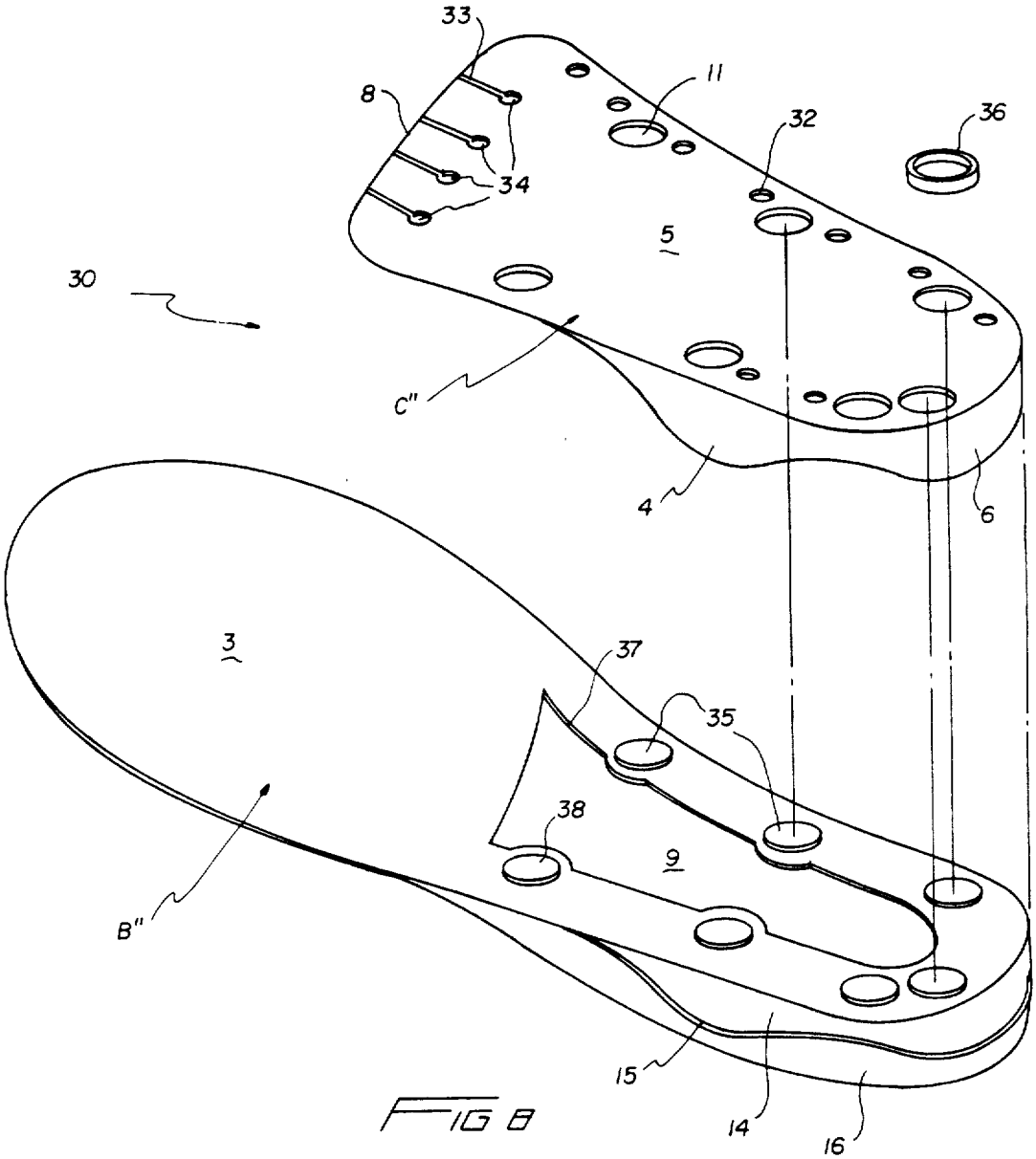
FIG. 8 is a perspective view of an embodiment in accordance with the instant application shown in perspective.

The cap main surface 5 includes the normal apertures 11 and, running along a medial, lateral and calcaneal aspect of the bottom surface thereof a plurality of apertures 32 are similarly provided adapted to receive resilient fingers for similar associated purposes and benefits. As can be seen in FIGS. 8 and 12, the marginal wall 4 includes a curved top edge 17 that includes a rear wall 6 of substantially uniform height, but as the wall extends forwardly, each side is provided with one downwardly extending undulation each respectively off set from the other in a plane transverse to the longitudinal axis, and thereafter an upwardly curved segment ultimately tapering downwardly to the flat area of the insert proximate to the metatarsal head area. A complemental contour on the peripheral wall 14 of the full length blank is also defined so that a interlocking is provided by the nesting interengagement of the shelf 15 with the top edge 17 and the undulations serve to not only assure registry of the blank and its cap, but also to encourage deformation of the two relative to foot pressure in a predetermined manner. It is to be noted that the medial marginal side wall has greater length and corresponds to and underlies the arch support so that the upwardly extending portion forward of the undulation on the medial side thereof underlies and causes additional beneficial support of the arch member, a consideration not necessary on the lateral aspect of the foot on its associated opposite site. As can be derived from a section of FIG. 8, the bottom face of the blank B" is provided with a plurality of substantially circular protuberances 35 having a planar bottom face adapted to nest within the apertures 11 so that the height of the protuberances causes a cap-protuberance bottom surface of substantially flush configuration. Though not limited in concept to this specific embodiment, an annular ring 36 can be provided along a bottom portion of the cap as shown in FIG. 8 adapted to be fixed by adhesion for frictional engagement of the protuberance so as to provide requisite angulation if so desired.

The recess 9 shown in FIG. 8 provides for areas of increased thickness 38 proximate thereto and adjacent each of the protuberances, so as to provide medial and lateral shelves on either side of the recess 9. The thickness 37 of the recess 9 is shown in FIG. 8. Also, it is to be appreciated that the recess is of narrowest width proximate the calcaneal or heel area and flares outwardly as it proceeds forward to the metatarsal area of the foot. The area adjacent the arch defines a leading edge of the recess, and the lateral aspect is feathered rearwardly relative thereto so as to encourage a controlled deformation of the recess in combination with the arch support and other structure.

Having thus described the preferred embodiment of the invention, it should be understood that numerous structural modifications and adaptations may be resorted to without departing from the spirit of the invention.

What is claimed is:

1. An orthotic appliance adapted to be placed as an insert within or form a part of a boot, shoe, or the like comprising in combination:

an initial blank having an upper surface that generally follows the contour of the plantar surface of a foot, a bottom surface of said blank having a zone of disparate resiliency relative to areas adjacent said zone, cap means underlying said bottom surface, and means for interfitting said cap to said blank wherein said interfitting means comprises a peripheral wall extending up from said cap engaging side walls of said blank, said side walls including a stepped in shelf portion complemental to the thickness of said peripheral wall so that the outer side edges of said appliance is substantially smooth.

2. An orthotic appliance adapted to be placed as an insert within or form a part of a boot, shoe, or the like comprising in combination:

an initial blank having an upper surface that generally follows the contour of the plantar surface of a foot, a bottom surface of said blank having a zone of disparate resiliency relative to areas adjacent said zone, cap means underlying said bottom surface, and means for interfitting said cap to said blank wherein said interfitting means comprises protuberances extending down from said bottom surface of said blank and aligned to register with openings in said cap wherein said interfitting means further comprises a peripheral wall extending up from said cap engaging side walls of said blank, said side walls including a stepped in shelf portion complemental to the thickness of said peripheral wall so that the outer side edges of said appliance is substantially smooth.

3. The device of claim 1 or 2 wherein said peripheral wall has an undulating top edge and said shelf has a contour complemental thereto.

4. The device of claim 1 or 2 wherein said cap terminates adjacent a metatarsal area of the foot and a leading edge thereof includes means for reducing pressure along the metatarsal aspect including longitudinally extending slot means.

5. The device of claim 1 or 2 wherein a cork-resin layer is interposed between said cap and said blank, said layer provided with a further zone of disparate resiliency and means for deforming said layer to bond said cap to said blank under controlled deformation of said layer.

6. The device of claim 1 or 2 including resilient fingers adapted to reside in apertures on said cap to alter the contour of said appliance.

7. The device of claim 1 or 2 including plugs of shock absorbant material attached to a bottom of the insert to vary the resilience thereof.

*8. An orthotic insert having a lengthwise axis and adapted to be positioned in a boot, shoe or the like, comprising:*

*a. a blank made from a relatively resilient and yielding material, and having an upper surface shaped to conform to a plantar surface of a foot and a bottom surface, said blank having upwardly extending side portions to engage at least lower side portions of a rear portion of the foot;*

*b. a cap made of a relatively rigid material and positioned below said blank, said cap having upwardly extending side portions to be positioned adjacent to, and laterally outwardly of, the side portions of the blank;*

*c. said blank and said cap having interengaging means arranged to limit relative movement between said cap and said blank so as to maintain said cap and said blank in proper alignment; and*

*d. said blank having adjacent to its lower surface a lower recess extending along said lengthwise axis at least at a rear portion of the blank, with lower side portions of the rear portion of the blank engaging the cap, said recess being arranged in a manner that a downward force exerted by the rear of the foot centrally on the rear portion of the blank causes the side portions of the blank to move inwardly to grip the lower side portions of the rear portion of the foot in a manner to provide controlled support for the rear portion of the foot as weight is transferred from the rear portion of the foot and through a mid-foot portion of the foot.*

*9. The device of claim 8 wherein said cap terminates adjacent a metatarsal area of the foot and a leading edge thereof includes means for reducing pressure along the metatarsal aspect including longitudinally extending slot means.*

*10. The device of claim 8 wherein a cork-resin layer is interposed between said cap and said blank, said layer being provided with means for deforming said layer to bond said cap to said blank under controlled deformation of said layer.*

*11. The device of claim 8 including resilient fingers adapted to reside in apertures on said cap to alter the contour of said appliance.*

*12. The device of claim 8 including plugs of shock absorbant material attached to a bottom of the insert to vary the resilience thereof.*

* * * * *